United States Patent [19]

McGivern

[11] 4,028,249
[45] June 7, 1977

[54] SEWAGE SETTLING TANK
[75] Inventor: Robert F. McGivern, Columbus, Ohio
[73] Assignee: Sybron Corporation, Rochester, N.Y.
[22] Filed: May 17, 1976
[21] Appl. No.: 686,946
[52] U.S. Cl. .......................... 210/242 R; 210/83; 210/252; 210/521
[51] Int. Cl.² .................. B01D 21/10; C02B 9/00; C02C 1/26
[58] Field of Search .......... 210/521, 522, 525, 527, 210/83, 242 R, 252, 253, 262, 263, 264, 265, 284, 285, 290, 291, 293, 513, 532

[56] References Cited
UNITED STATES PATENTS

| 2,202,772 | 5/1940 | Durdin | 210/DIG. 9 |
|---|---|---|---|
| 2,305,929 | 12/1942 | Lund et al. | 210/527 |
| 2,375,590 | 5/1945 | Schonberg et al. | 210/521 |
| 2,468,069 | 4/1949 | Hunter | 210/523 |
| 3,333,704 | 8/1967 | McGivern et al. | 210/242 R |
| 3,669,271 | 6/1972 | McGivern | 210/242 R |

Primary Examiner—Frank W. Lutter
Assistant Examiner—Frank Sever
Attorney, Agent, or Firm—Theodore B. Roessel; Roger Aceto

[57] ABSTRACT

The efficiency of a sewage settling tank is improved by providing the tank with a plurality of submerged, vertically spaced decks which divide the tank into a plurality of horizontal settling layers. This improves the settling rate in that solids travel a relatively short vertical distance before coming to rest on one or another of the decks. A floating siphon system having inlets at each deck level removes the settled sludge from each of the decks.

9 Claims, 3 Drawing Figures

SEWAGE SETTLING TANK

BACKGROUND OF THE INVENTION

The present invention relates generally to water or sewage settling tanks and particularly to an improvement in the settling tank and floating siphon system for removing sludge from the bottom of the tank as shown in my U.S. Pat. No. 3,333,704, issued Aug. 1, 1967. The operation of settling tanks is well known in the art. Briefly, the liquid to be treated is introduced at one end of the tank while the clarified liquid is removed from the other end. As liquid travels from the inlet to the outlet, under conditions of non-turbulent flow, solids settle out of the liquid and on to the bottom of the settling tank. Various devices are employed for removing the solids from the bottom of the settling tank, one such device being that siphon system illustrated in my patent.

Settling tanks for treating municipal or industrial water supplies or sewage waste are relatively large and it is not unusual for such tanks to be 10 to 12 feet deep. Consequently, the tank must be relatively long or flow must be relatively slow in order to permit ample time for the solids and fine materials to settle the full vertical height of the tank on to the bottom before the liquid leaves the tank outlet. While the settling rate could be increased, and the efficiency of the tank improved by decreasing the depth of the tank, this heretofore could not be economically accomplished and still maintain the required tank capacities.

Plate settlers are known in which a plurality of closely spaced horizontal plates are placed within the tank. Here the plates are either placed at a slight incline so that sludge may move down the plates by gravity to a removal trough or, in some cases, the plates are movable so they can all be tilted as a unit for removing the sludge. The use of a siphon system as illustrated in my U.S. Pat. No. 3,333,704 to remove sludge from such plate settlers is not practical for two reasons. First, some provision must be made to permit the siphon inlet to extend both the full vertical height of the tank and to move the full length of the tank. For this reason, there can be no plate which extends the full width of the tank. Secondly, there can not be any support structure between the vertically spaced plates which would interfere with the free passage of the siphon inlet over the entire plate surface of all the plates.

According to the present invention, even existing settling tanks can be easily and economically modified so as to provide a multi-level tank which decreases the settling distance and therefore the settling time and which utilizes a floating siphon system that provides an efficient means for removing the settled materials from each tank layer.

SUMMARY OF THE INVENTION

The present invention can be characterized in one aspect thereof by the provision of a settling tank containing a plurality of vertically spaced decks which divide the tank into horizontal layers or settling zones, the decks being arranged so as to leave an unobstructed vertical channel extending substantially the full length of the settling tank; an inlet for liquid to be treated and an outlet for treated liquid communicating with each of the tank layers or settling zones at opposite ends thereof; a carriage floating on the liquid in the settling tank and movable from one end of the tank to the other; and a plurality of siphons carried by the carriage, each siphon having a depending leg extending down the vertical channel to one of the decks and a horizontal header extending across the deck for purposes of removing the sludge which has settled on to the deck.

DESRIPTION OF THE PREFERRED EMBODIMENTS

Figure 1:
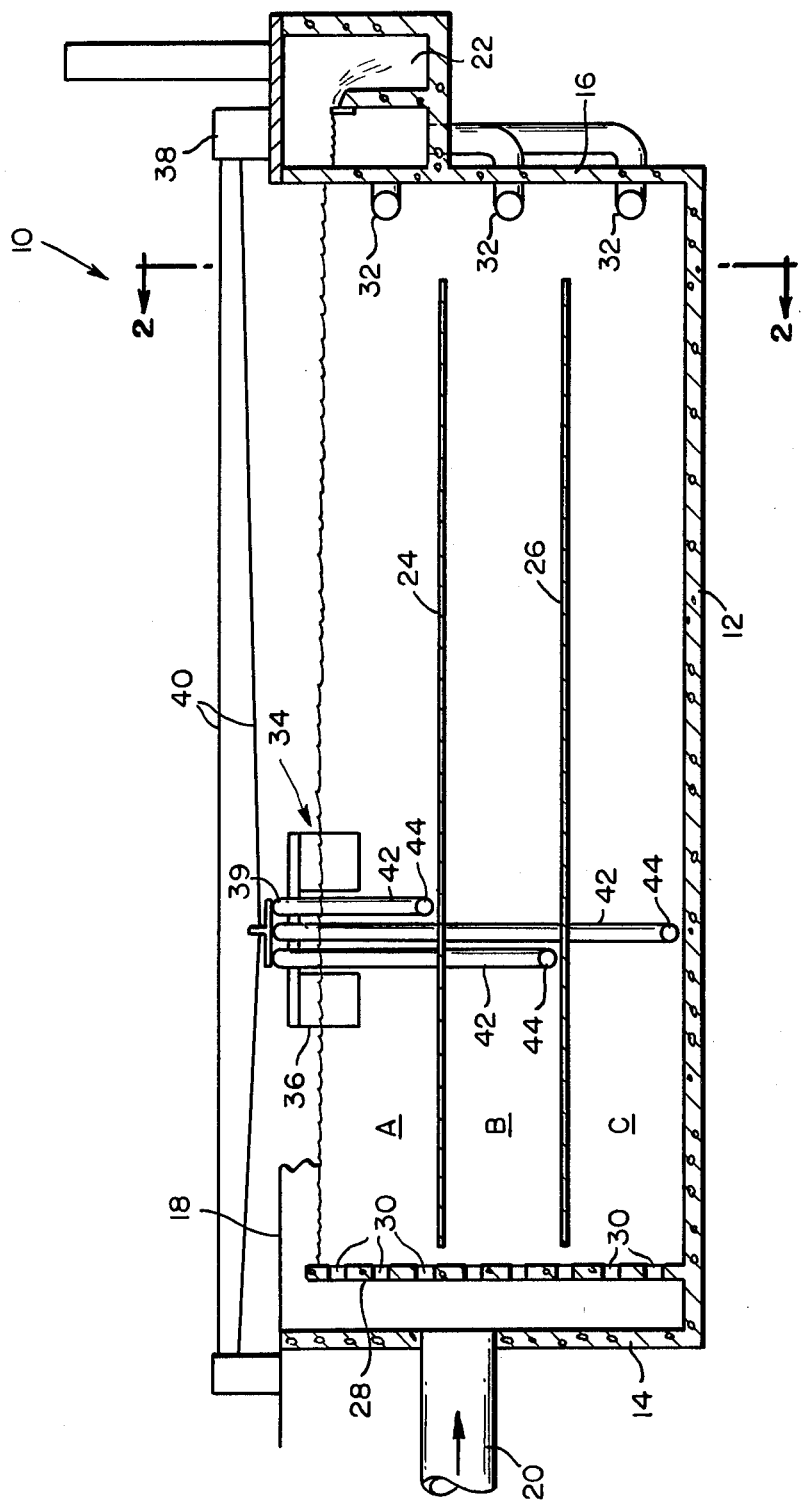
FIG. 1 is an elevation view, in section, showing the settling tank of the present invention.

Referring to the drawings, FIG. 1 shows the settling tank generally indicated at 10 to include a bottom 12 with upstanding front and rear end walls 14, 16 respectively and side walls 18. The inlet of the tank for untreated liquids is indicated at 20 and the outlet for treated liquid is indicated at 22.

Arranged within the settling tank are vertically spaced decks 24 and 26. While only two decks 24 and 26 are shown, it should be appreciated that any number of such decks could be used. These decks divide the settling tank into a plurality of horizontal settling layers or zones indicated at A, B and C respectively.

Just downstream of inlet 20 is a vertical baffle member 28 which extends substantially the full depth of the settling tank. The baffle is provided with a series of vertically and horizontally spaced openings 30 which define liquid inlets opening directly to each of the horizontal layers A, B and C. This arrangement insures that a portion of the liquid to be treated is introduced directly into each of the layers at the inlet end of the settling tank. By the same token, the settling tank has separate collector headers 32 for treated liquid disposed at the opposite end of each layer A, B and C, these headers all communicating with outlet 22. Thus, the liquid to be treated enters directly into each of the layers A, B and C through baffle openings 30, travels the length of the tank and then exits through headers 32 and outlet 22 at the opposite end. During flow through the tank, solids and fine materials present in the liquid in each zone settle on to one or another of the decks 24, 26 and the bottom 12 of the tank. With this arrangement, the solids present in the liquid entering through the baffle openings at the top of baffle 28 and into layer A have to settle only a relatively short distance on to deck 24 instead of settling the entire depth of the tank and on to bottom 12. In the same way solids and fine materials present in the liquid introduced to layer B and C settle the relatively short distances to deck 26 and the bottom 12 respectively. In this manner, the settling rate and efficiency of the tank is improved over a like tank without the intermediate deck members 24, 26.

In order to remove the materials which are settled on to the bottom of the tank and each deck, the present invention provides a floating siphon system generally indicated at 34. The system includes a floating carriage 36 which is moved from one end of the tank to the other by any suitable drive means such as the reversable motor 38 and cable 40 shown in FIG. 1. The floating carriage 36 supports a plurality of siphons 39, there being one siphon for each of the layers within the settling tank. Each siphon includes a depending leg 42 terminating in a horizontal inlet branch 44 which extends transverse of the deck with which it is associated.

Figure 2:
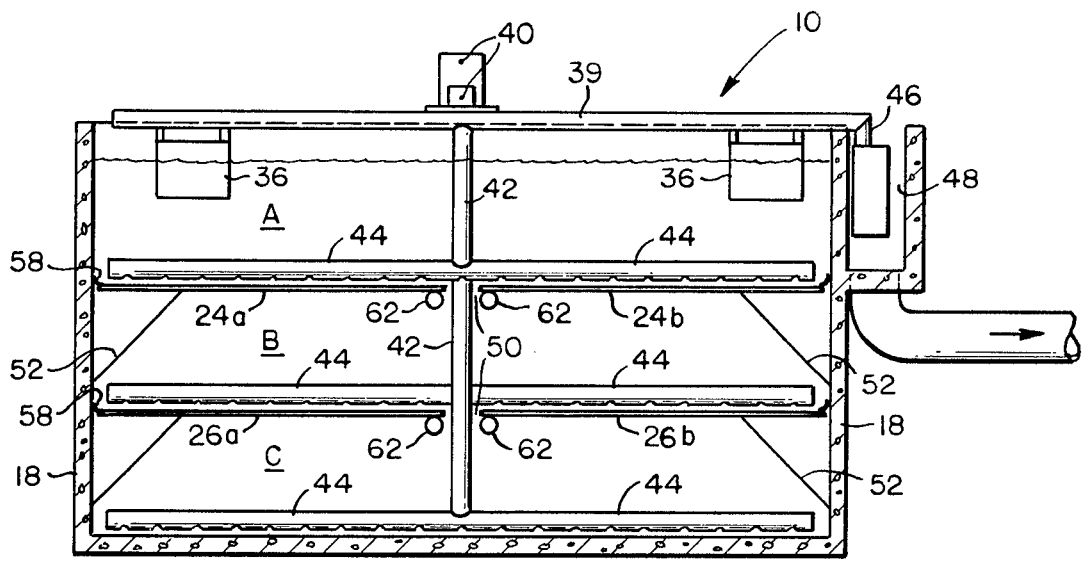
FIG. 2 is a view taken along lines 2—2 of FIG. 1.

Referring to FIG. 2, each siphon is shown to have an outlet leg 46 which is disposed to discharge the sludge and settled particles into a sludge removal trough 48. As is well known in the art, the sludge removal trough is outside the settling tank and runs along one of the tank side walls 18.

FIG. 2 also shows that in order for the depending leg 42 of each siphon to extend down to each of the levels, a clear vertical passage through each of the decks 24 and 26 is necessary. This is accomplished by having each of the decks arranged in left and right hand sections indicated by the letters *a* and *b* respectively. As shown in FIG. 2, each of these sections extend from the opposite side walls 18 toward the center of the settling tank. Each of the sections, then, terminates short of the center to provide a passage 50 through each deck so that there is a clear unobstructed vertical path through the center of the settling tank for the passage of the depending legs of the siphon. The horizontal branches 44 of each siphon then extend from the center of the tank outward toward each opposite side 18 wall so as to be able to sweep the settled materials from across the full width of each deck section and the bottom of the settling tank.

As stated herein above and as is obvious from FIG. 2, any vertical structure for supporting the deck sections which extends up from the bottom of the settling tank or from a lower deck section to the one above would interfere with the movement of the horizontal inlet branches 44. In other words, there must be a freeboard area beneath each deck section to accommodate passage of branches 44. According to the present invention such deck supporting structure is eliminated and the freeboard area is provided by making each deck section buoyant so they tend to float in the liquid. Then, each section is prevented from rising to the surface by a cable 52 which tethers each deck section to the side of the tank as set out hereinbelow.

Figure 3:
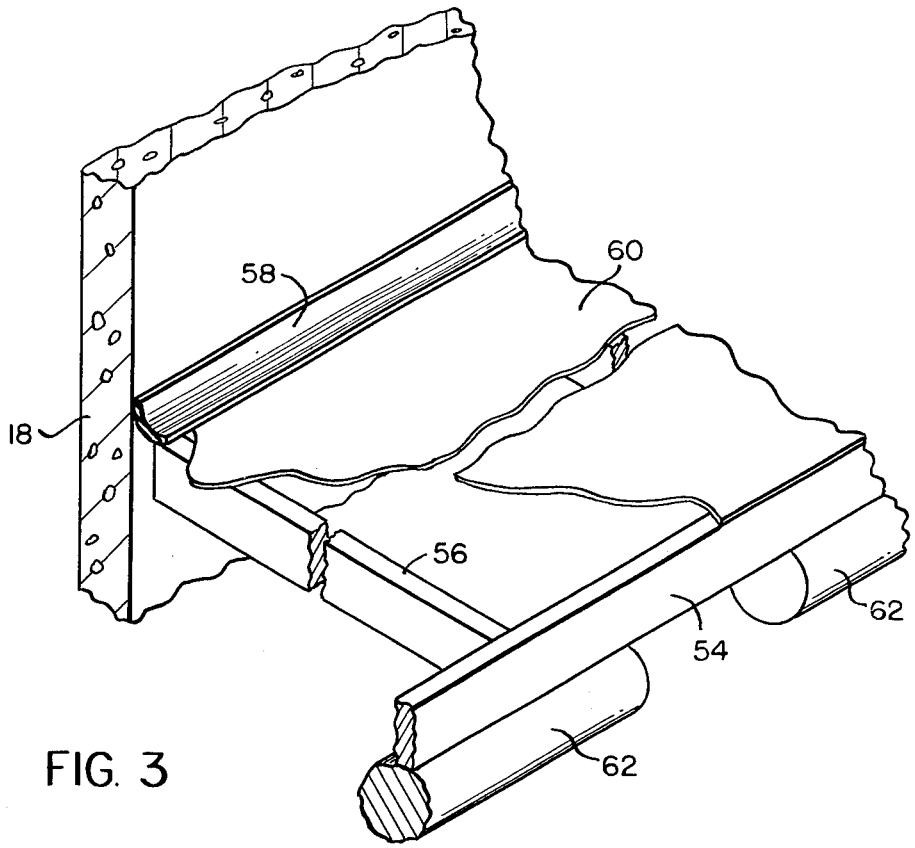
FIG. 3 is a perspective view on an enlarged scale showing a portion of a deck according to the present invention.

As best shown in FIG. 3, each deck section is formed by lateral and transverse members 54, 56 respectively joined so as to form an open frame. Each frame is supported and connected along one edge to the tank side wall 18 by a hinge member 58. The open frame formed by these members is covered by a thin sheet of plastic or other suitable material 60 which defines the upper surface of each deck and the surface on which the settled materials collect. Float members 62 attached beneath and at spaced intervals along the unsupported end of the frame provides the required buoyancy to raise the deck section about hinge 58.

Tie-down cables 52 tether each deck section to side walls 18. These tie-down cables are of a length sufficient to permit floats 62 to raise each of the deck sections to a substantially horizontal position. Thus each of the deck sections is relatively simple in construction and has a slight positive buoyancy due to the presence of floats 62, this buoyancy being counteracted by the tie-down cables 52 so as to maintain the deck sections in a substantially horizontal position without any supporting structure extending between the decks to block passage of siphon branches 44. Should the tank be dewatered at any time, these deck sections will simply swing downward about hinges 58 until the floats came to rest on the bottom of the tank.

In operation, then, the liquid to be treated is simply introduced directly into the horizontal layers A, B and C through baffle openings 30. The liquid travels through the tank and is removed through collector headers 32 at the opposite end. During flow through the tank the solids and fine materials present in each of the three layers settles on to the decks and the bottom of the settling tank. The siphon system 34 is then moved back and forth from one end of the tank to the other with the horizontal branches 44 removing the material which has collected on the decks and the bottom of the tank. The openings 50 provided by the spaces between the sections *a* and *b* of each deck allows for the free passage of the depending siphon legs 42 down to the bottom of the tank and free movement of the depending legs from one end to the other. In this fashion the sludge and other settled materials is removed from each deck and the tank bottom.

Thus, it should be appreciated that the present invention provies a relatively simple arrangement for dividing a settling tank into a plurality of horizontal layers for purposes of reducing the effective settling depth and thereby increasing the efficiency of the tank. Due to the use of the floating siphon system for removing sludge from the various layers of the tank, the deck sections which define the layers can be relatively simple in construction as they are not required to support any weight other than that of the material which accumulates on the decks.

The deck sections themselves are easily constructed and are simply "floated" in the liquid in the tank to divide the tank into a plurality of horizontal settling layers. Being easily and simply constructed, the decks as described can be incorporated into existing settling tanks with a minimum of effort and cost.

Having thus described the invention in detail, what is claimed as new is:

1. A sewage or water settling tank comprising:
   a. a bottom and upstanding side and end walls defining said tank;
   b. deck members spaced vertically in said tank to divide the same horizontally into a plurality of settling zones, said deck members being discontinuous across their width to provide an unobstructed vertical channel extending the full depth and length of said tank;
   c. inlet means for liquid to be treated at one end of said tank and an outlet for treated liquid at the opposite end, each of said deck members and said tank bottom defining surfaces to receive sludge settling from the liquid in said tank during flow of the liquid from said inlet to said outlet means;
   d. a carriage capable of floating on the surface of liquid in said tank;
   e. a sludge removal siphon system carried by said carriage, said siphon system including a plurality of depending inlet legs each disposed in said vertical channel and each terminating in a horizontal branch extending over one of said deck members and said tank bottom for removing the sludge accumulating thereon; and
   f. means for traversing said carriage from one end of said tank to the other whereby sludge is removed from substantially the full width and length of each deck member and said tank bottom.

2. A sewage or water settling tank comprising:
   a. a bottom and upstanding side and end walls defining said tank;
   b. a plurality of open, generally rectangular, buoyant frames dividing said tank into a plurality of horizontal settling zones, said frames each formed by joined lateral and transverse members, said lateral members extending generally the length of said tank and said transverse members extending less than one-half the width of said tank;

c. a hinge connecting each frame to a side wall of said tank;

d. a sheet material covering each of said open frames to provide settling surfaces spaced above the bottom of said tank; and e. means for restraining said frames against the buoyancy thereof so as to maintain said frames in a horizontal orientation at predetermined vertically spaced submerged positions in said tank.

3. A sewage or water settling tank as in claim 2 includinng inlet means for liquid to be treated communicating directly with each of said settling zones at one end of said settling tank and a plurality of outlets for treated liquid, one of said outlets communicating directly with each said settling zones at the opposite end of said settling tank, the solids carried by the liquid to be treated settling on to said settling surfaces and the bottom of said tank during flow of liquid from said inlet means to said outlets.

4. A sewage or water settling tank comprising:

a. a bottom and upstanding side and end walls defining said tank;

b. a plurality of vertically spaced deck members each hinged by hinge connections, along one edge to a side wall of said settling tank for dividing said tank into a plurality of horizontal settling zones;

c. float means for raising said deck members about said hinge connections; and d. means for restraining said deck members against the buoyancy of said float means so as to maintain each of said deck members in a horizontal orientation at predetermined vertically spaced submerged positions in said tank.

5. A sewage or water settling tank as in claim 4 wherein said means for restraining said deck members comprises a tether cable fixed to and extending between each of said deck members and a side wall of said tank, said tether cable being of a length sufficient to permit each of said deck members to rise about said hinged edge to a substantially level position.

6. A sewage or water settling tank as in claim 4 wherein each deck member extends inward into said tank from said hinged edge and terminates short of the center line of said tank so as to provide an open vertical channel extending the full depth and substantially the full length of said tank.

7. A sewage or water settling tank as in claim 6 wherein said float means is fixed to each of said deck members adjacent said channel.

8. A sewage or water settling tank as set out in claim 6 including means for removing settled sludge from each of said deck members comprising a siphon syste floating on the surface of the liquid in said tank, said system having a depending siphon inlet leg extending down through said open vertical channel, said inlet leg terminating in a horizontal branch extending over said deck member.

9. A sewage or water settling tank as in claim 8 wherein said siphon system has a plurality of said depending siphon inlet legs, one extending down to the level of each deck member and to the bottom of said settling tank.

* * * * *